US012779726B2

(12) United States Patent
Jang et al.

(10) Patent No.: US 12,779,726 B2
(45) Date of Patent: Nov. 3, 2026

(54) NOTCHING APPARATUS FOR ELECTRODE SUBSTRATE OF RECHARGEABLE BATTERY

(71) Applicant: SAMSUNG SDI CO., LTD., Yongin-si (KR)

(72) Inventors: Youngjin Jang, Yongin-si (KR); Jinmyung Jo, Yongin-si (KR); Sungjin Kwon, Yongin-si (KR); Junghun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 18/215,086

(22) Filed: Jun. 27, 2023

(65) Prior Publication Data

US 2024/0001580 A1 Jan. 4, 2024

(30) Foreign Application Priority Data

Jun. 30, 2022 (KR) ........................ 10-2022-0080905

(51) Int. Cl.
*B26F 1/12* (2006.01)
*B26F 1/14* (2006.01)
(Continued)

(52) U.S. Cl.
CPC .................. *B26F 1/12* (2013.01); *B26F 1/14* (2013.01); *H01M 2004/021* (2013.01); *H01M 4/04* (2013.01)

(58) Field of Classification Search
CPC ...... B26F 1/44; B26F 1/22; B26F 1/14; B26F 1/40; B26F 1/12; B26F 2001/449;
(Continued)

(56) References Cited

U.S. PATENT DOCUMENTS 557,142 A * 3/1896 McGill .................. B23D 33/02 83/366
2,624,940 A * 1/1953 Roy .......................... B26F 1/36 30/131
(Continued)

FOREIGN PATENT DOCUMENTS

CN 113145719 A 7/2021
DE 41 06 068 A1 10/1991
(Continued)

OTHER PUBLICATIONS

GB-2587859-A, Translation (Year: 2026).*
(Continued)

*Primary Examiner* — Nhat Chieu Q Do

(74) *Attorney, Agent, or Firm* — Womble Bond Dickinson (US) LLP

(57) ABSTRACT

A notching apparatus for an electrode substrate of a rechargeable battery is provided. The notching apparatus includes: a lower plate assembly including a die; an upper plate assembly including a punch facing toward the die; and a pusher on a first side of the punch and the die in a second direction. The pusher is configured to notch an electrode from an electrode substrate passing between the lower plate assembly and the upper plate assembly in a first direction and to separate scrap generated during the notching by pressing with a blade. The blade connects an exterior and an interior of the die in the second direction, and at least one of a first side of the punch and the die have a recess configured to accommodate the blade.

10 Claims, 9 Drawing Sheets

(51) Int. Cl.
*H01M 4/02* (2006.01)
*H01M 4/04* (2006.01)

(58) Field of Classification Search
CPC .......... B26F 2001/4481; B21D 45/003; B21D 28/02; B26D 7/1818; H01M 2004/021; H01M 50/105; H01M 4/04; H01M 4/02; Y02E 60/10
USPC ........................................................... 83/553
See application file for complete search history.

(56) References Cited

U.S. PATENT DOCUMENTS

| | | | | |
|---|---|---|---|---|
| 6,102,268 A | | 8/2000 | Raveleau | |
| 6,832,535 B1 | * | 12/2004 | Hulstedt | B23D 33/02 83/99 |
| 6,997,363 B1 | | 2/2006 | Vossen | |
| 8,156,780 B2 | * | 4/2012 | Fellenberg | B21D 28/02 83/17 |
| 2002/0038589 A1 | * | 4/2002 | Kawai | B21D 28/12 83/552 |
| 2012/0111166 A1 | | 5/2012 | Yamada et al. | |

FOREIGN PATENT DOCUMENTS

| | | | | | |
|---|---|---|---|---|---|
| GB | 2587859 A | * | 4/2021 | | B21D 28/16 |
| JP | 2020-097110 A | | 6/2020 | | |
| JP | 2022-089693 A | | 6/2022 | | |
| KR | 10-2012-0034397 A | | 4/2012 | | |
| KR | 10-1370855 B1 | | 3/2014 | | |
| KR | 10-1550023 B1 | | 9/2015 | | |
| KR | 101853050 B1 | * | 4/2018 | | |
| KR | 10-2019-0112379 A | | 10/2019 | | |
| KR | 10-2059581 B1 | | 12/2019 | | |
| KR | 10-2392988 B1 | | 4/2022 | | |
| KR | 10-2022-0059398 A | | 5/2022 | | |
| KR | 10-2495105 B1 | | 2/2023 | | |
| KR | 102535344 B1 | * | 5/2023 | | B26D 7/1863 |
| WO | WO 2010/082372 A1 | | 7/2010 | | |

OTHER PUBLICATIONS

KR-102535344-B1, Translation (Year: 2026).*
Extended European Search Report issued in corresponding EP Application No. 23182725.4, dated Nov. 22, 2023, 7 pages.
Chinese Office Action issued in corresponding Application No. CN 202310787445.8, dated Dec. 29, 2025, 9 pages.
Notice of Allowance issued by CNIPA and dated Jun. 5, 2026 for corresponding Chinese Patent Application No. 202310787445.8, 4 pages.

* cited by examiner

NOTCHING APPARATUS FOR ELECTRODE SUBSTRATE OF RECHARGEABLE BATTERY

CROSS-REFERENCE TO RELATED APPLICATION

This application claims priority to and the benefit of Korean Patent Application No. 10-2022-0080905, filed in the Korean Intellectual Property Office on Jun. 30, 2022, the entire content of which is incorporated herein by reference.

BACKGROUND

1. Field

Aspects of embodiments of the present disclosure relate to a notching apparatus for an electrode substrate of a rechargeable battery.

2. Description of the Related Art

A rechargeable (or secondary) battery is a battery that is designed to be repeatedly charged and discharged, unlike a primary battery. Small-capacity secondary batteries are used in small portable electronic devices, such as mobile phones, notebook computers, and camcorders. High-capacity and high-density secondary batteries are used for power or energy storage for driving motors in hybrid and electric vehicles.

A rechargeable battery generally includes an electrode assembly for charging and discharging a current, a case or pouch for receiving (or accommodating) the electrode assembly and an electrolyte solution, and an electrode terminal connected to the electrode assembly and drawn to (or extending to) an outside of the case or pouch. The electrode assembly may be a jelly roll type formed by winding electrodes and a separator or a stack type formed by stacking electrodes and a separator.

An electrode used in a stack type rechargeable battery may be manufactured by notching the electrode substrate, which has a coated portion and an uncoated portion. A notching apparatus used in a notching process of the electrode substrate typically includes a lower mold assembly having a die and an upper mold assembly having a punch. The notching apparatus manufactures the electrode by notching the electrode substrate that is inserted between the lower plate mold assembly and the upper plate mold assembly into a desired shape by the relative ascending and/or descending operation of the die and the punch.

During this process, scrap is generated on the lower side of the punch and the inner side of the die. To remove the scrap, an air method, a pin method, a pusher method using a tension spring, a pusher method using a cam, and the like are used.

In the tension spring pusher method, the pusher moves forward due to the tension spring when the mold rises, and as the pusher moves forward, a blade descends to push the scrap to the lower side of the mold. In this method, the rigidity (or spring force) of the tension spring may deteriorate due to repetitive cycling, and in this case, parts may not be moved to accurate positions, which may cause an accident.

In the cam pusher method, a drive holder connected to a cam moves forward and backward by the ascension or descension of the mold, and when the pusher moves forward, the blade descends to push the scrap to the lower side of the mold. This method may prevent take-out errors according to the driving of the mold, but the cam and pusher may be damaged when the cam and pusher are restrained by foreign substances.

SUMMARY

Embodiments of the present disclosure provide a notching apparatus for an electrode substrate of a rechargeable battery that can smoothly discharge scrap generated while manufacturing an electrode by notching a supplied electrode substrate.

According to an embodiment of the present disclosure, a notching apparatus for an electrode substrate of a rechargeable battery is provided. The notching apparatus includes: a lower plate assembly including a die; an upper plate assembly including a punch facing toward the die; and a pusher on a first side of the punch and the die in a second direction. The pusher is configured to notch an electrode from an electrode substrate passing between the lower plate assembly and the upper plate assembly in a first direction and to separate scrap generated during the notching by pressing with a blade. The blade connects an exterior and an interior of the die in the second direction, and at least one of a first side of the punch and the die have a recess configured to accommodate the blade.

The punch may have a receiving recess at a lower surface thereof configured to accommodate a first end of the blade.

The first end of the blade may include three branch structures configured to notch the electrode substrate.

The pusher may include: an upper block mounting the blade on a first hinge as an operation center, the upper block elasticity supporting a second end of the blade at a second side of the operation center in a downwardly direction to vertically operate a first end of the blade at a first side of the operation center; and a lower block at a lower side of the upper block, the lower block having a hook mounted therein and configured to be releasably coupled to the first end of the blade at by a second hinge and to elasticity support the hook from an exterior side to an interior side in the second direction.

The upper block may have a first height portion at a relatively low height in the interior side in the second direction and a second height portion at a relatively higher height than the first height portion in the exterior side in the second direction. The first hinge may be the operation center of the blade and may be in a first through-hole vertically extending therethrough at a boundary between the first height portion and the second height portion.

The second height portion may include a first elastic member in a vertical direction, the second end of the blade may be at a lower side of the second height portion and may receive an elastic force from the first elastic member, and the first end of the blade may be at a lower side of the first height portion and may receive a downward force from the punch.

The lower block may be configured to receive a lower end of the hook in a second through-hole at and vertically extending through a lower side of the second height portion and a lower side of the boundary.

The blade may have a hook pin in the first height portion, the lower block may have a second elastic member in the second direction, and the hook may receive an elastic force from the second elastic member to be coupled to the hook pin when the blade descends and to be disengaged from the hook pin when the blade ascends.

The hook pin may have a curved surface and an axis extending in the first direction, and the hook may protrude toward the curved surface and may have an upper inclined surface and a lower inclined surface facing the hook pin.

The blade may have a third through-hole at an upper side of a second through-hole into which the hook extends in a vertical direction, and the hook pin may extend into the third through-hole in the first direction.

The blade may have a connection portion connecting the first end of the blade and a portion of the blade forming the third through-hole, and the connection portion may be in the recess.

According to embodiments of the present disclosure, a pusher configured to separate scrap by pressing with a blade is provided, and the blade connects an exterior and an interior of the die. Further, the die and/or the punch has a recess to accommodate the blade. Therefore, when the electrode is manufactured by notching the supplied electrode substrate, the generated scrap may be smoothly discharged by the pusher.

DETAILED DESCRIPTION

Figure 1:
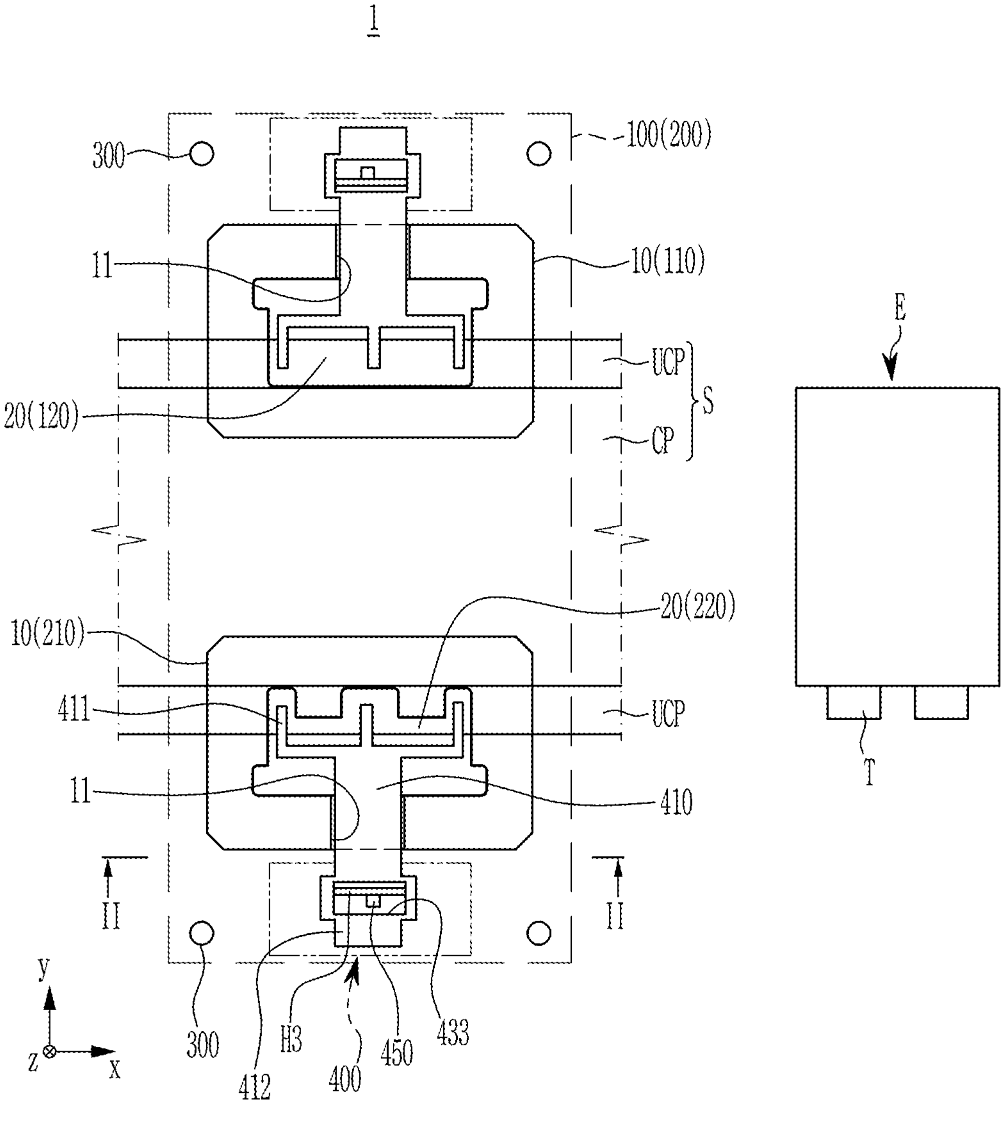
FIG. 1 is a top plan view of a notching apparatus for an electrode substrate of a rechargeable battery according to an embodiment.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure. In other words, the drawings and description are to be regarded as illustrative in nature and not restrictive.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Figure 2:
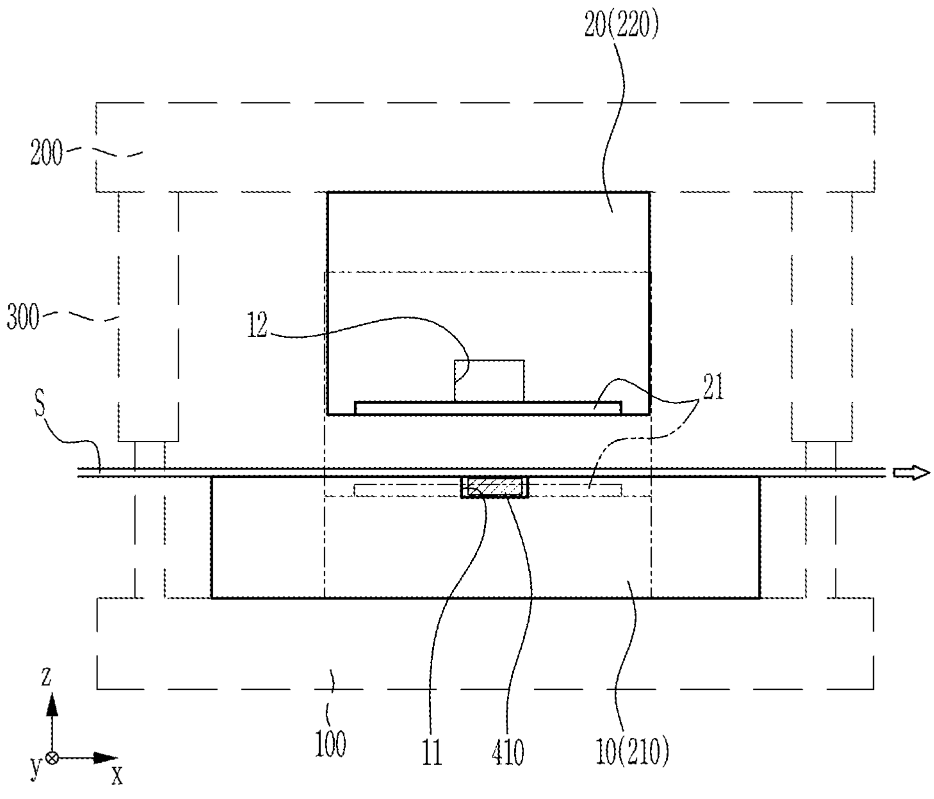
FIG. 2 is a front view of the notching apparatus viewed along the line II-II of FIG. 1.

FIG. 1 is a top plan view of a notching apparatus for an electrode substrate of a rechargeable battery according to an embodiment, and FIG. 2 is a front view of the notching apparatus taken along the line II-II of FIG. 1. Referring to FIG. 1 and FIG. 2, a notching apparatus, according to an embodiment, includes a lower plate mold assembly 100 (hereinafter referred to as a lower plate assembly) provided with a die 10, an upper plate mold assembly 200 (hereinafter referred to as an upper plate assembly) provided with a punch 20, and a pusher 400. The upper plate assembly 200 and the lower plate assembly 100 are interconnected to each other by a lifting member 300 that guides movement of the upper and lower plate assemblies 200 and 100 in opposite directions (e.g., towards and away from each other). In one embodiment, the pusher 400 may be mounted on the lower plate assembly 100.

The upper plate assembly 200 faces in a third direction (e.g., a z-axis direction) crossing an x-y plane toward an electrode substrate S that passes in a first direction (e.g., an x-axis direction) on the lower plate assembly 100 and has a width in a second direction (e.g., a y-axis direction) crossing the first direction. The punch 20 faces the die 10 such that the electrode substrate S in the x-y plane may be notched into (e.g., to form) an electrode E.

The electrode substrate S may be unwound from a reel to be continuously supplied between the upper plate assembly 200 and the lower plate assembly 100 and has a coated portion CP disposed (or extending) along the x-axis direction in a middle thereof in the y-axis direction and an uncoated portion UCP disposed (or extending) along the x-axis direction at both ends (or edges) of the electrode substrate S in the y-axis direction.

Because the notched electrode E forms a different structure (has a different shape) from both ends of the electrode substrate S in a width direction (e.g., the y-axis direction), the die 10 provided in the lower plate assembly 100 includes a first die 110 and a second die 210 for notching in different shapes from the electrode substrate S, and the punch 20 provided on the upper plate assembly 200 corresponding thereto includes a first punch 120 and a second punch 220.

The first die 110 and the first punch 120 are provided to a first side of the electrode substrate S in the second direction to notch a first side of the electrode E, and the second die 210 and the second punch 220 is provided to a second side of the electrode substrate S in the second direction to notch a second side of the electrode E. In an embodiment, the second die 210 and the second punch 220 are formed to notch the uncoated portion UCP into a tab T portion of the electrode E, and the first die 110 and the first punch 120 are formed to notch the opposite portion (e.g., the coated portion CP) of the electrode E. Hereinafter, for convenience, the second die 210 and the second punch 220 will be described as an example.

The pusher 400 is provided at a first side of the die 10 and the punch 20 in the second direction (e.g., the y-axis direction) and is configured to separate scrap SCR (see, e.g., FIG. 3 and FIG. 6) generated by notching the electrode E from the electrode substrate S by pressing by a blade 410. The blade 410 is disposed to connect an exterior and an interior of the die 10 in the second direction (e.g., the y-axis direction). For this purpose, in an embodiment, the die 10 and the punch 20 have recesses 11 and 12 on which the blade 410 may be laid (e.g., through which the blade 410 may pass). In some embodiments, the recess may be formed only in the die 10 or only in the punch 20 depending on the shape of the blade 410.

The punch 20 has a receiving recess 21 for accommodating a first end 411 of the blade 410 on a lower surface. When the punch 20 notches the electrode E from the electrode substrate S in cooperation with the die 10, the receiving recess 21 allows the first end 411 of the blade 410 disposed between the punch 20 and the die 10 to press the scrap SCR to be separated from (e.g., away from) the electrode substrate S, the electrode E, the die 10, and the punch 20 without interfering with the notching process.

Figure 4:
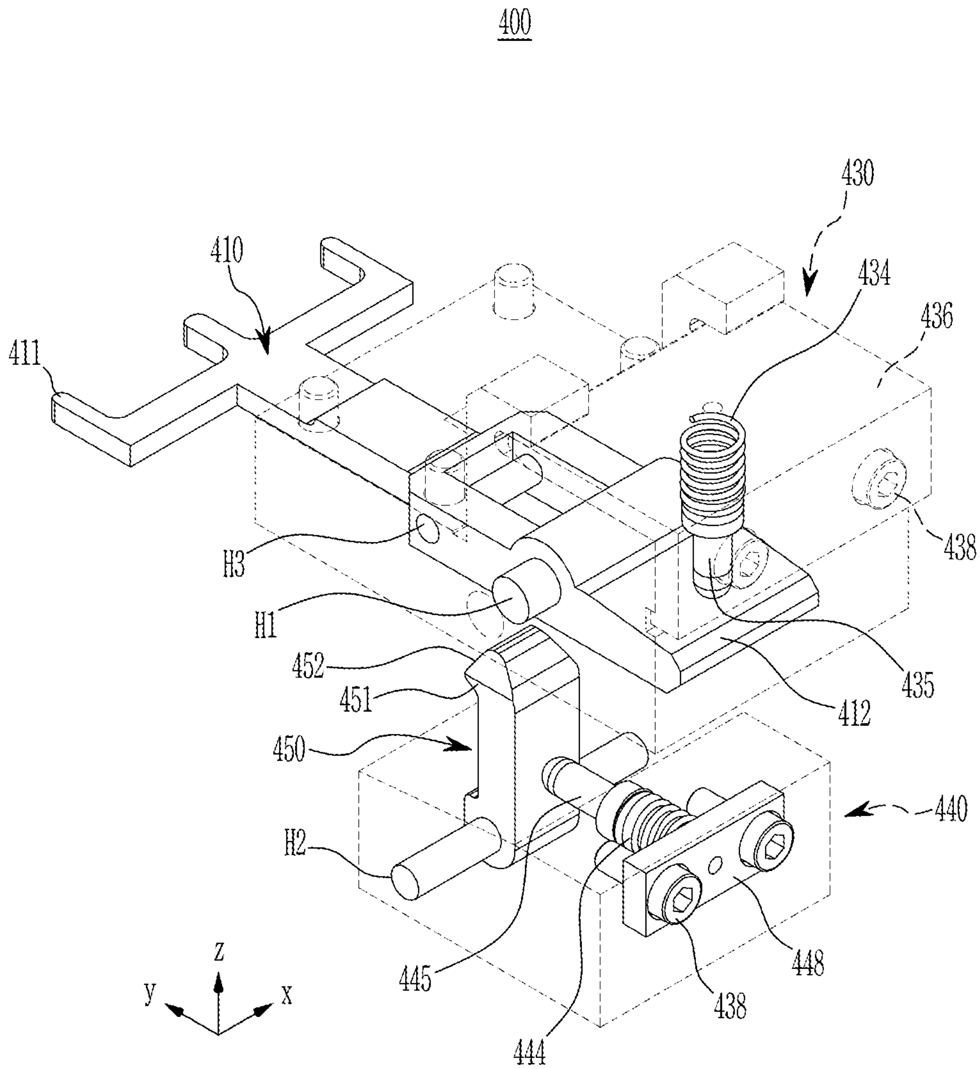
FIG. 4 is a perspective view of the pusher shown in FIG. 1 and FIG. 3.

The first end 411 of the blade 410 may have three branch structures (or branch protrusions) corresponding to the uncoated portion UCP at an outside or an opposite side of the tab T of the electrode E (see, e.g., FIG. 4). The three branch structures provide separation force to the scrap SCR along the first direction (e.g., the x-axis direction) at both ends of the electrode E in the second direction (e.g., the y-axis direction) that are notched and may thereby prevent separation error of the scrap SCR.

Figure 3:
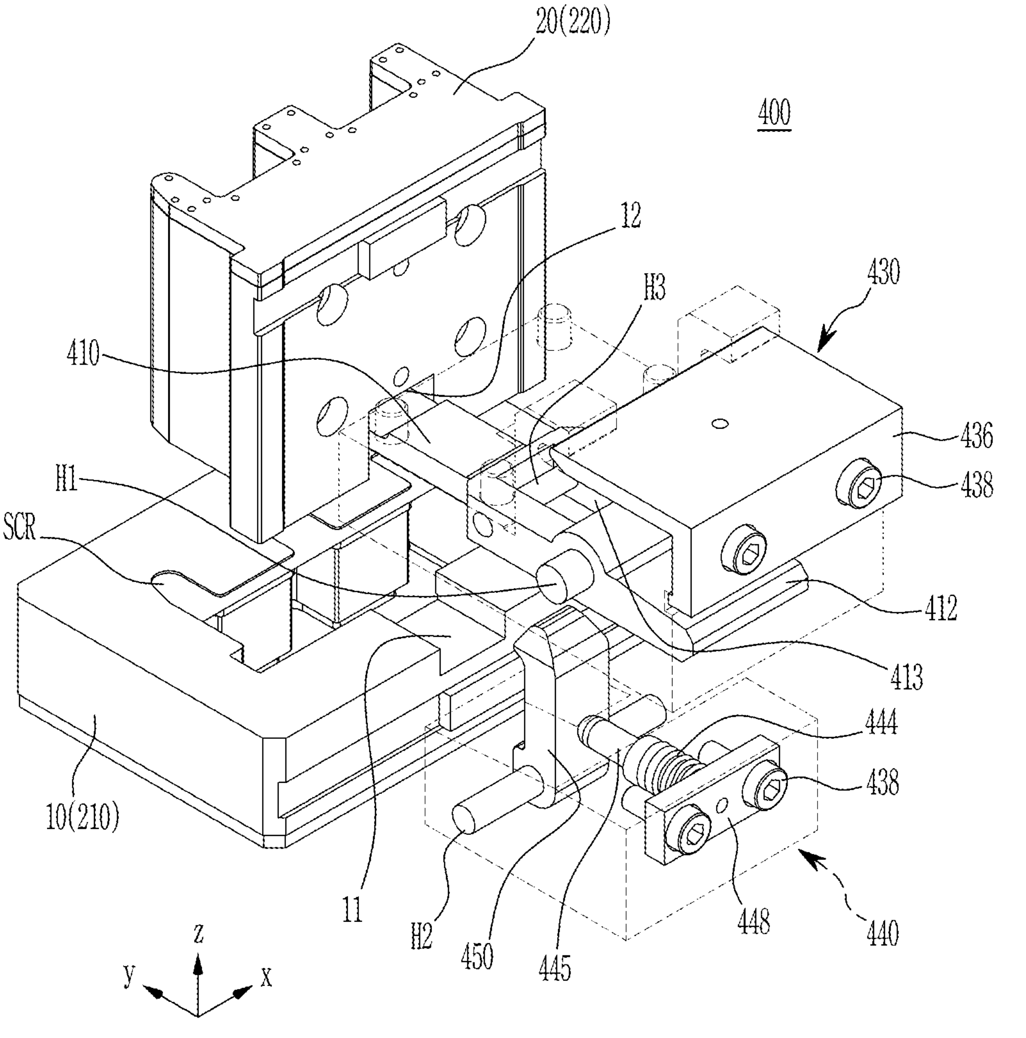
FIG. 3 is a perspective view showing a die, a punch, and pusher applied to a notching apparatus for an electrode substrate of a rechargeable battery shown in FIG. 1.
Figure 5:
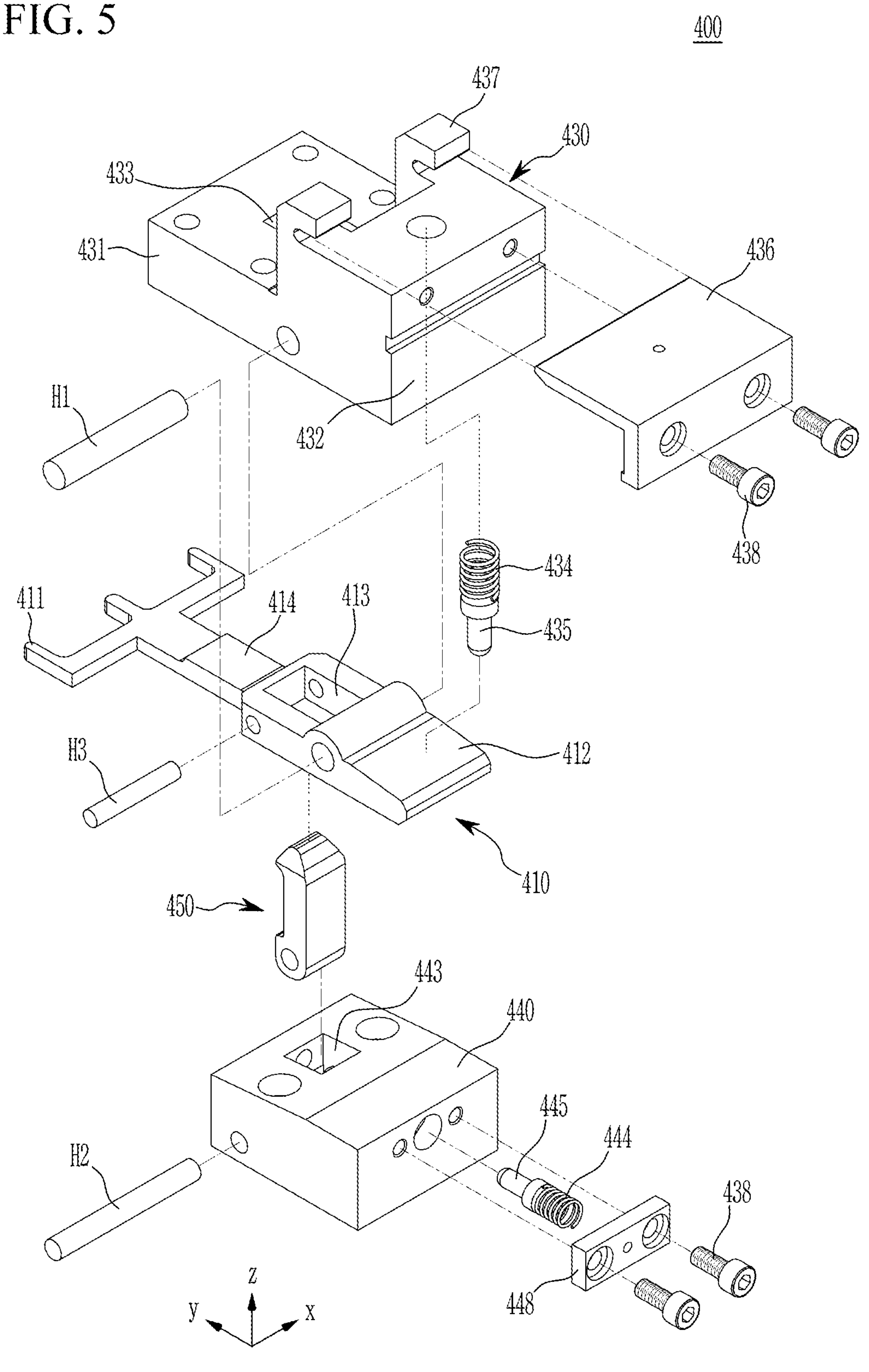
FIG. 5 is an exploded perspective view of the pusher shown in FIG. 4.
Figure 6:
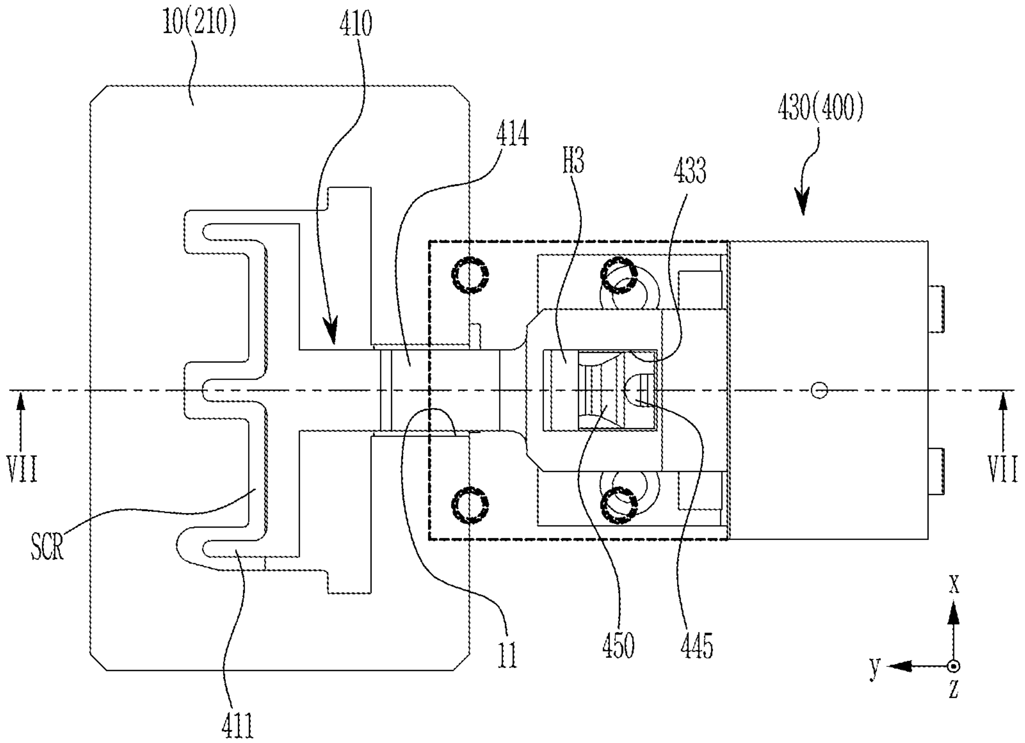
FIG. 6 a top plan view showing a state in which a blade of the pusher shown in FIG. 4 is disposed in a die and a scrap shown in FIG. 3.

FIG. 3 is a perspective view showing a die, a punch, and pusher of the notching apparatus for an electrode substrate of a rechargeable battery shown in FIG. 1. FIG. 4 is a perspective view of the pusher shown in FIG. 1 and FIG. 3. FIG. 5 is an exploded perspective view of the pusher shown in FIG. 4. FIG. 6 a top plan view showing a state in which a blade of the pusher shown in FIG. 4 is disposed in a die with scrap shown in FIG. 3. Referring to FIG. 3 to FIG. 6, the pusher 400 includes an upper block 430 and a lower block 440.

The upper block 430 mounts the blade 410 at an operation center (e.g., a pivot center) by a first hinge H1 and is configured to elasticity support a second end 412 of the blade 410 positioned at a second side of the operation center in downward direction such that the first end 411 of the blade 410 positioned at a first side of the operation center may be operated in a vertical direction.

The lower block 440 is provided at a lower side of the upper block 430 and is configured have a second hinge H2 mounted at a lower end thereof with a hook 450 that can be coupled to or released from the first end 411 at the operation center of the blade 410 and to elasticity support the hook 450 from the exterior side to the interior side in the second direction (e.g., the y-axis direction).

For example, the upper block 430 includes a first height portion 431 and a second height portion 432 (see, e.g., FIG. 5). The first height portion 431 is formed at a relatively low height in the interior side in the second direction (e.g., the y-axis direction). The second height portion 432 is formed at the exterior side in the second direction and at a height higher than that of the first height portion 431.

The upper block 430 has a first through-hole 433 penetrating (or extending through), in the vertical direction, at the boundary between the first height portion 431 and the second height portion 432, and the operating center of the blade 410 is located at the first through-hole 433 by the first hinge H1. Accordingly, at the lower side of the upper block 430, the blade 410 forms the first end 411 at the interior side in the second direction (e.g., the y-axis direction) and forms the second end 412 at the exterior side with the first hinge H1 as the operation center.

Figure 7:
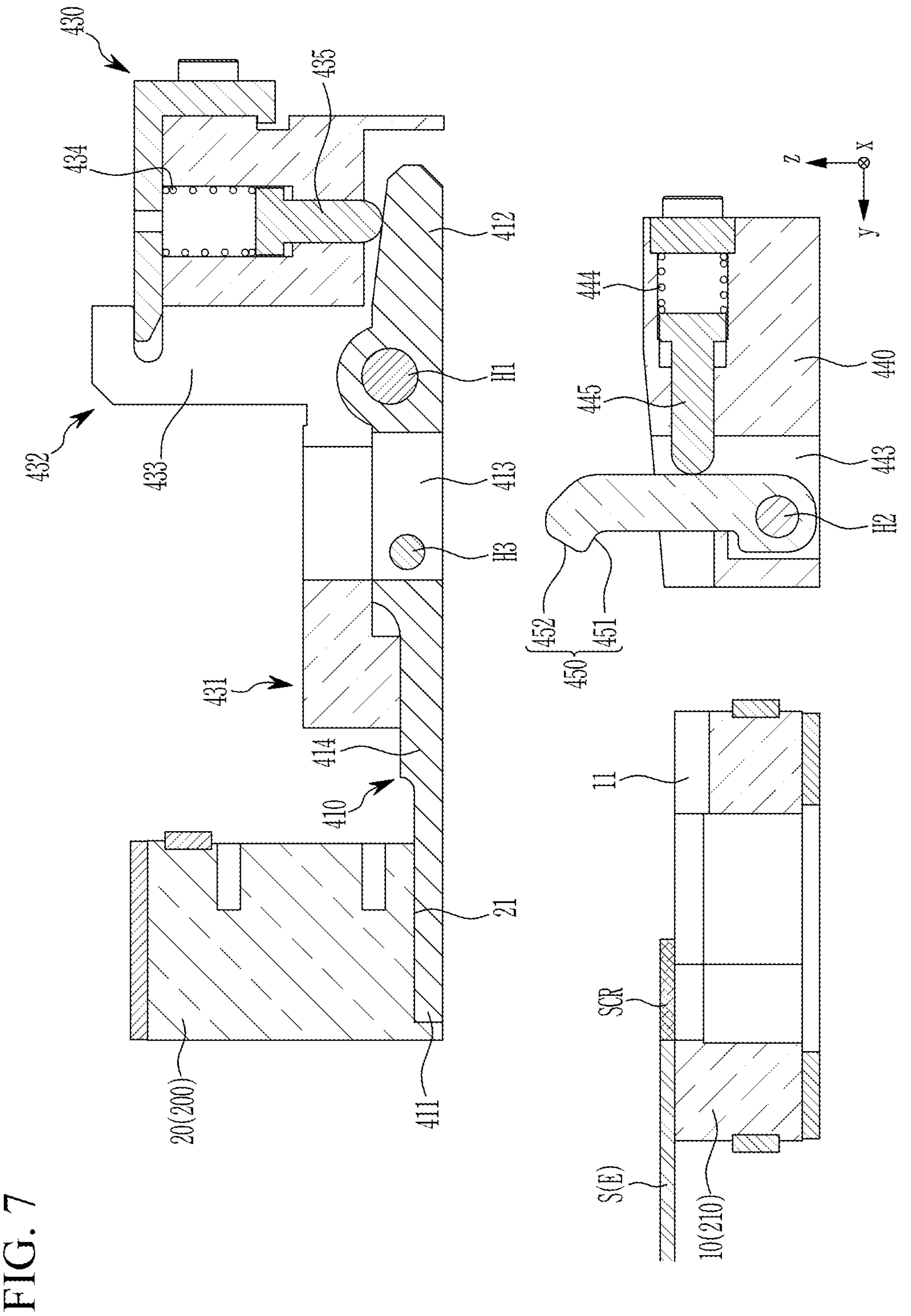
FIG. 7 is a cross-sectional view taken along the line VII-VII of FIG. 6 and shows operation states of a punch and an upper block immediately before descending for the notching, during descending, during ascending after the notching, and after ascending.

FIG. 7 is a cross-sectional view taken along line VII-VII of FIG. 6 and shows operation states of a punch and an upper block at the time of immediately before descending for the notching, during descending, during ascending after the notching, and after ascending. Referring to FIG. 3 to FIG. 7, the second height portion 432 includes the first elastic member (e.g., a first spring) 434 in the vertical direction.

As an example, the first elastic member 434 is embedded in (e.g., is accommodated in a recess in) the second height portion 432 between the first push member 435 and supported by a cover 436. The cover 436 is coupled to (e.g., is retained in) a protrusion 437 formed at an upper end of the second height portion 432 at a first side and is fixed to the second height portion 432 by a bolt 438 passing through a second side, thereby facilitating embedding of the first elastic member 434 and the first push member 435 in the upper block 430.

The second end 412 of the blade 410 is provided at a lower side of the second height portion 432 and receives a downward elastic force from the first elastic member 434 via the first push member 435. The first end 411 of the blade 410 is disposed at a lower side of the first height portion 431 and receives a downward force of the punch 20. The downward force of the punch 20 overcomes the elastic force of the first elastic member 434 and lowers the first end 411 of the blade 410 with the first hinge H1 as the operation center (e.g., about the first hinge H1 as the pivot point) and, therefore, presses and separates the notching scrap SCR from the electrode substrate S and the electrode E.

The lower block 440 is provided at a lower side of the second height portion 432 and has with a second through-hole 443 penetrating therethrough (or extending therethrough) in the vertical direction. A lower end of the hook 450 is positioned in the second through-hole 443 and installed to the lower block 440 by the second hinge H2. Accordingly, the hook 450 operates having the second hinge H2 as its operation center (e.g., pivots about the second hinge H2).

The blade 410 is provided with a hook pin H3 that passes through (e.g., is in) the first height portion 431. A second elastic member (e.g., a second spring) 444 is embedded in the lower block 440 in the second direction. As an example, the second elastic member 444 is embedded in the lower block 440 pushing the second push member 445 and fixed by a plate 448 and a bolt 438.

The hook 450 receives the elastic force of the second elastic member 444 via the second push member 445 to be coupled to (e.g., to be latched onto) the hook pin H3 when the blade 410 descends. When the blade 410 rises, the hook 450 is coupled to the hook pin H3 while receiving an elastic force and is then released as the hook pin H3 rises.

As an example, the hook pin H3 is formed as a curved surface (e.g., as a cylindrical rod) centered on (e.g., having an axis extending in) the first direction (e.g., the x-axis direction). The hook 450 protrudes toward the curved surface of the hook pin H3 and has an upper inclined surface 452 and a lower inclined surface 451 facing the hook pin H3 (see, e.g., FIG. 7).

The upper inclined surface 452 of the hook 450 softens the engagement with the hook pin H3 to reduce coupling shock when the blade 410 descends, and the lower inclined surface 451 softens the disengagement with the hook pin H3 to reduce the release shock when the blade 410 ascends.

The blade 410 has a third through-hole 413 above (e.g., aligned vertically with) the second through-hole 443 such that the hook 450 is inserted in (e.g., passes or extends into) the third through-hole 413 in the vertical direction (e.g., z-axis direction). The hook pin H3 is installed by extending through the third through-hole 413 in the first direction. The blade 410 is provided with a connection portion 414 connecting the first end 411 and portion of the blade 410 forming the third through-hole 413, and the connection portion 414 is located in the recesses 11 and 12 (see, e.g., FIG. 6 and FIG. 7).

Figure 8:
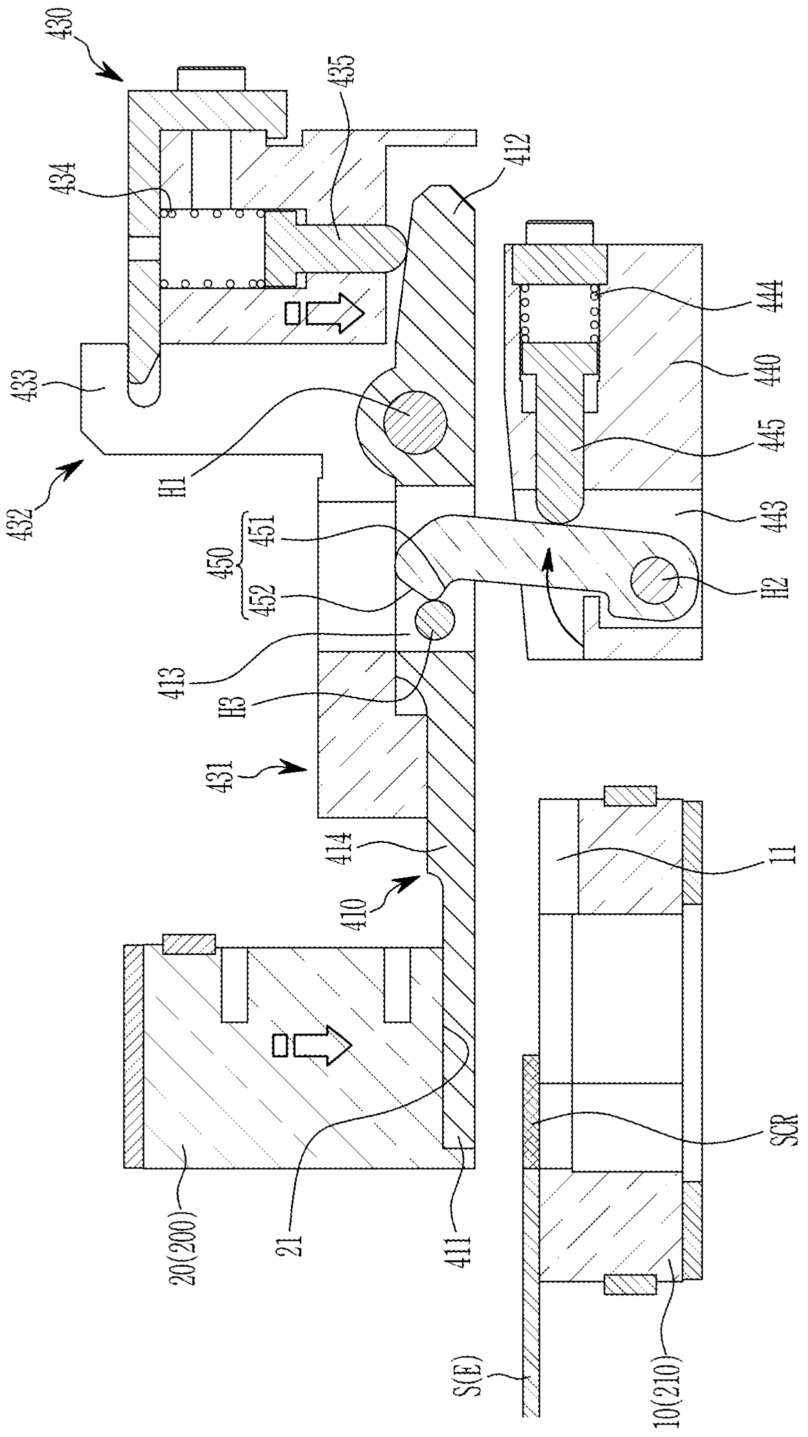
FIG. 8 shows an operation state in which hook pin has rotated a hook around a second hinge as a punch and an upper block further descends for the notching from the state shown in FIG. 7.

FIG. 8 shows an operation state in which the hook is in contact with the hook pin and has rotated about the second hinge as the punch and the upper block further descends for the notching from the state shown in FIG. 7. Referring to FIG. 7 and FIG. 8, the notching apparatus notches the electrode substrate S to the electrode E while the punch 20 and the die 10 ascend and descend in opposite directions.

FIG. 7 is a cross-sectional view taken along the line VII-VII of FIG. 6, and shows operation states of a punch and an upper block at the time of immediately before descending for the notching, during descending, during ascending after the notching, and after ascending. FIG. 7 illustrates a state just before descending for notching, and in this state, the punch 20 and the upper block 430 are located at the highest level.

Before (e.g., immediately before) the punch 20 and the upper block 430 descend for notching, in the upper block 430 of the pusher 400, the second end 412 of the blade 410 receives a downward elastic support force from the first elastic member 434 via the first push member 435, and accordingly, the first end 411 of the blade 410 rotates around the first hinge H1 as the operation (or rotation) center to be accommodated in the receiving recess 21 of the punch 20. At this time, the connection portion 414 may be located in the recess 12.

In the lower block 440 of the pusher 400, the hook 450 receives an elastic support force inward in the second direction (e.g., the y-axis direction) from the second elastic member 444 via the second push member 445. Accordingly, the hook 450 rotates around the second hinge H2 and maintains a state of maximum inward rotation in the second direction (e.g., the y-axis direction) (see, e.g., FIG. 7).

Referring to FIG. 7 and FIG. 8, the punch 20 and the upper block 430 equally descend from the state shown in FIG. 7 to the state shown in FIG. 8. Referring to FIG. 8, the punch 20 and the upper block 430 have additionally descended from the state shown in FIG. 7 for notching. Accordingly, the punch 20 and the upper block 430 further approach the die 10 and the lower block 440, and the blade 410 further approaches the electrode substrate S and the hook 450.

At this time, the hook pin H3 pushes the hook 450 to rotate around the second hinge H2. As a result, the hook 450 rotates around the second hinge H2 and maintains the maximum turning state outwardly in the second direction (e.g., the y-axis direction) (state in FIG. 8). The hook 450 is elastically supported by the elastic force of the second elastic member 444.

Figure 9:
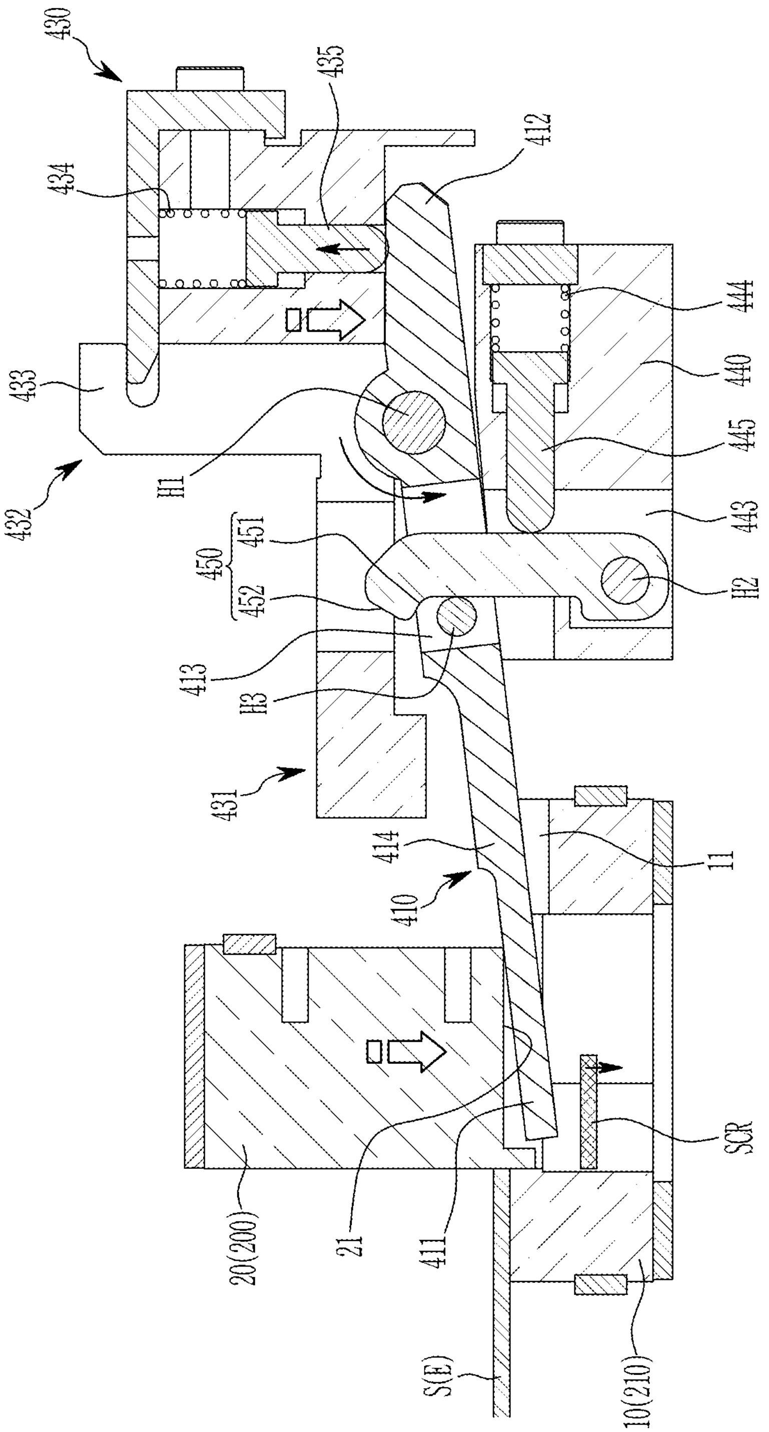
FIG. 9 shows states during the notching and after completing the notching as the punch and the upper block further descend from the state shown in FIG. 8 and a punch descends further than the upper block.

FIG. 9 shows states during the notching and after completing the notching as the punch and the upper block further descend from the state shown in FIG. 8 and as a punch descends further than the upper block.

Referring to FIG. 8 and FIG. 9, the punch 20 and the upper block 430 descend differently from the state shown in FIG. 8 to the state shown in FIG. 9. For example, the punch 20 descends more than (or farther than) the upper block 430 does. Therefore, from a state in which the upper block 430 is in contact with the lower block 440, the punch 20 may further descend into the die 10.

As the punch 20 descends, in the upper block 430, the first end 411 of the blade 410 is pressed to descend. Thus, the scrap SCR may be separated from the electrode E that is notched from the electrode substrate S. At this time, the connection portion 414 is located in the recesses 11 and 12 and the second end 412 of the blade 410 moves upwardly while overcoming the force of the first elastic member 434 and the second push member 445.

In the lower block 440 of the pusher 400, the hook 450 is rotated around the second hinge H2 by the second elastic member 444 and the second push member 445 and thereby rotates inwardly in the second direction (e.g., the y-axis direction) until it is stopped by an upper surface of the hook pin H3.

Referring to FIG. 9 and FIG. 8, the punch 20 and the upper block 430 ascend differently from the state shown in FIG. 9 to the state shown in FIG. 8. For example, the punch 20 ascends more than (e.g., farther than) than the upper block 430 does. Therefore, from a state in which the upper block 430 is separated from the lower block 440, the punch 20 further ascends out of the die 10.

At this time, in the upper block 430, the second end 412 of the blade 410 is pressed by the ascending of the punch 20 (e.g., is pressed by the first elastic member 434 and the second push member 445), and accordingly, the first end 411 ascends. At this time, the connection portion 414 is located on the recess 12, and the second end 412 of the blade 410 is elastically supported by the first elastic member 434 and the first push member 435.

In the lower block 440 of the pusher 400, the hook 450 is elasticity supported by the second elastic member 444 and the second push member 445 while being pushed outwardly in the second direction by the hook pin H3 (see, e.g., FIG. 8).

In addition, referring to FIG. 8 and FIG. 7, the punch 20 and the upper block 430 equally ascend from the state shown in FIG. 8 to the state shown in FIG. 7. Therefore, the punch 20 and the upper block 430 become spaced apart from the die 10 and the lower block 440, and the blade 410 becomes spaced apart from the electrode substrate S and the hook 450. At this time, the hook 450 receives the elastic force by the second elastic member 444 and the second push member 445 to rotate back around the second hinge H2 while disengaging from the hook pin H3. This completes one notching process (or one notching cycle).

A notching apparatus, according to an embodiment of the present disclosure, may repetitively perform the operation from the state shown in FIG. 7 to the state shown in FIG. 8, the operation from the state shown in FIG. 8 to the state shown in FIG. 9, and the reversal operations, to thereby manufacture the electrode E by notching the electrode substrate S that is continuously supplied while smoothly discharging the generated scrap SCR.

While this disclosure has been described in connection with what is presently considered to be practical embodiments, it is to be understood that the disclosure is not limited to the disclosed embodiments. On the contrary, the present disclosure intended to cover various modifications and equivalent arrangements included within the spirit and scope of the appended claims and their equivalents.

| Description of Some Reference symbols |
|---|
| 10: die |
| 11, 12: recess |
| 20: punch |
| 21: receiving recess |
| 100: lower plate assembly |
| 110: first die |
| 120: first punch |
| 200: upper plate assembly |
| 210: second die |
| 220: second punch |
| 400: pusher |
| 410: blade |
| 411: first end |
| 412: second end |
| 414: connection portion |
| 430: upper block |
| 431: first height portion |
| 432: second height portion |
| 433: first through-hole |
| 434: first elastic member |
| 435: first push member |
| 436: cover |
| 437: protrusion |
| 438: bolt |
| 440: lower block |
| 443: second through-hole |
| 444: second elastic member |
| 445: second push member |
| 448: plate |
| 450: hook |
| 451: lower inclined surface |
| 452: upper inclined surface |
| CP: coated portion |
| E: electrode |
| H1: first hinge |
| H2: second hinge |
| H3: hook pin |
| S: electrode substrate |
| SCR: scrap |
| T: tab |
| UCP: uncoated portion |

What is claimed is:

1. A notching apparatus for an electrode substrate of a rechargeable battery, the notching apparatus comprising:

a lower plate assembly comprising a die having a first recess;

an upper plate assembly comprising a punch having a second recess and configured to notch an electrode from an electrode substrate; and a pusher configured to separate scrap generated during the notching by pressing the scrap from the punch, wherein the electrode substrate passes between the lower plate assembly and the upper plate assembly in a first direction, wherein the pusher is positioned to a side of the punch and the die in a second direction crossing the first direction, wherein the punch is configured to move with respect to the die in a third direction crossing the first direction and the second direction, wherein the first recess is located on a side of the die to face the pusher in the second direction, wherein the second recess is located to face the first recess in the third direction, wherein the pusher includes a blade extending in the second direction and accommodated in at least one of the first recess and the second recess, and wherein the blade is configured to pivot such that a first end of the blade moves from the second recess toward the scrap inside of the first recess and a pivot point on the side of the punch in the second direction.

2. The notching apparatus of claim 1, wherein the first end of the blade comprises three branch structures configured to notch the electrode substrate.

3. The notching apparatus of claim 1, wherein the pusher comprises:

an upper block mounting the blade on a first hinge as an operation center, the upper block elasticity supports a second end of the blade at a second side of the operation center in a downwardly direction to vertically operate the first end of the blade at a first side of the operation center; and a lower block at a lower side of the upper block, the lower block having a hook mounted therein and configured to be releasably coupled to the first end of the blade at by a second hinge and to elastically support the hook from an exterior side to an interior side in the second direction.

4. The notching apparatus of claim 3, wherein the upper block has a first height portion at a relatively low height in the interior side in the second direction and a second height portion at a relatively higher height than the first height portion in the exterior side in the second direction, and wherein the first hinge is the operation center of the blade and is in a first through-hole vertically extending there-through at a boundary between the first height portion and the second height portion.

5. The notching apparatus of claim 4, wherein the second height portion comprises a first elastic member in a the third direction, wherein the second end of the blade is at a lower side of the second height portion and receives an elastic force from the first elastic member, and wherein the first end of the blade is at a lower side of the first height portion and receives a downward force from the punch.

6. The notching apparatus of claim 4, wherein the lower block is configured to receive a lower end of the hook in a second through-hole at and vertically extending through a lower side of the second height portion and a lower side of the boundary.

7. The notching apparatus of claim 4, wherein the blade has a hook pin in the first height portion, wherein the lower block has a second elastic member in the second direction, and wherein the hook receives an elastic force from the second elastic member to be coupled to the hook pin when the blade descends and to be disengaged from the hook pin when the blade ascends.

8. The notching apparatus of claim 7, wherein the hook pin has a curved surface and an axis extending in the first direction, and wherein the hook protrudes toward the curved surface and has an upper inclined surface and a lower inclined surface facing the hook pin.

9. The notching apparatus of claim 7, wherein the blade has a third through-hole at an upper side of a second through-hole into which the hook extends in a the third direction, and wherein the hook pin extends into the third through-hole in the first direction.

10. The notching apparatus of claim 9, wherein the blade has a connection portion connecting the first end of the blade and a portion of the blade forming the third through-hole, and wherein the connection portion is in the first recess or the second recess.

* * * * *